United States Patent
Pham (10) Patent No.: US 11,472,351 B2
(45) Date of Patent: Oct. 18, 2022

(54) CAR LICENSE PLATE SYSTEM

(71) Applicant: Tony Pham, Granite Bay, CA (US)

(72) Inventor: Tony Pham, Granite Bay, CA (US)

( * ) Notice: Subject to any disclaimer, the term of this patent is extended or adjusted under 35 U.S.C. 154(b) by 0 days.

(21) Appl. No.: 17/109,930

(22) Filed: Dec. 2, 2020

(65) Prior Publication Data

US 2022/0169188 A1 Jun. 2, 2022

(51) Int. Cl.
*B60R 13/10* (2006.01)

(52) U.S. Cl.
CPC .................................. *B60R 13/105* (2013.01)

(58) Field of Classification Search
CPC .... B60Q 1/30; B60Q 1/28; B60Q 1/26; G09F 2007/1895; G09F 2007/1865; B60R 2011/004; B60R 1/105
See application file for complete search history.

(56) References Cited

U.S. PATENT DOCUMENTS

| | | | | |
|---|---|---|---|---|
| 10,518,721 | B1 * | 12/2019 | Nowakowski | G09F 21/048 |
| 10,933,820 | B1 * | 3/2021 | Budraitis | B60R 11/04 |
| 2012/0281426 | A1 * | 11/2012 | Polka | B60R 19/50 |
| | | | | 362/549 |
| 2013/0270316 | A1 * | 10/2013 | Angara | B60R 13/105 |
| | | | | 224/510 |

* cited by examiner

*Primary Examiner* — Cassandra Davis
(74) *Attorney, Agent, or Firm* — John D. Tran; Rhema Law Group (57) ABSTRACT

In an embodiment, a system comprises a first arm configured at a first position in a vertical direction. The system also comprises a second arm configured at a second position in the vertical direction, wherein the second arm is parallel to the first arm, and configured to hold a display along with the first arm in the vertical direction. The system can also include top connector connected to the first and second arm and configured below the first and second arm. The system can also include a bottom connector configured below the top connector. The bottom connector and top connector provide additional structure support for a v-slot for alignment and positioning to the front portion of the device and enable the first and second arm to securely hold the display at a front end of the device.

19 Claims, 4 Drawing Sheets

CAR LICENSE PLATE SYSTEM

TECHNICAL FIELD

The present disclosure generally relates to a car license plate displayed in front of an automobile without be in contact with the automobile. More specifically, the present invention provides device that displays the license plate without the license plate being placed in contact with the automobile.

BACKGROUND

License plates are typically installed at the front and back of an automobile. The license plate is often screwed onto the front and the back of the automobile via screws. As a result the license plate is in direct contact with both the front and the back of the automobile.

In order to secure a copy of the license plate to both the front portion and the back portion of the automobile, a plurality of holes often have to be made into the front and the back of the automobile. As a result, the structure of the front and the back of the automobile can be adversely affected by the plurality of holes that have to be made to place screws to secure the license plate onto the vehicle.

A need exists to have the license plate displayed in front of the automobile, (and in back of the automobile in some embodiments), without having to place the license plate in direct contact with the automobile, but also securely display the license plate in front of the automobile in a similar manner to a license plate that is directly screwed onto the front portion of the automobile.

There is also a need to ensure that a license plate is securely displayed in front of the automobile without any unauthorized tampering or removal. License plates can currently be removed by unauthorized users who can manage to remove the screws from the automobile. As such, a need exists to ensure that the license plate remains in place without being tampered with or removed by unauthorized users.

SUMMARY

An embodiment relates to a system comprising a first arm configured at a first position in a vertical direction. The system can also include a second arm configured at a second position in the vertical direction. The second arm is parallel to the first arm, and configured to hold a display along with the first arm in the vertical direction. The system can also include a top connector configured in a horizontal direction. The top connector is connected to the first arm and the second arm and configured below the first arm and second arm. The top connector is configured to provide additional structure support for a v-slot for alignment and positioning to a front portion of the device. The system can also include a bottom connector configured below the top connector in the horizontal direction. The bottom connector is configured to provide additional structure support for the v-slot for alignment and positioning to the front portion of the device. The bottom connector and top connector are positioned to the front portion of the device and enable the first arm and second arm to securely hold the display at the front portion of the device. The system can also include levers positioned above and below the top connector and the bottom connector. The levers are configured onto the front portion of the device to enable the top and bottom connector to be secured onto the front portion of the device.

The levers enable the top and bottom connector to be positioned onto the front portion of the device.

A torx screw is configured to prevent tamperting of the display or unauthorized removals of the display.

An embodiment relates to a system comprising a left arm installed at a first position. The system also includes a right arm installed at a second position parallel to the left arm. The left arm is configured to hold a license plate with the left arm at a front portion of an automobile. The system also includes a first connector configured beneath the left and right arm. The first connector is configured within a front grill of the automobile. The system can also include a second connector configured underneath the first connector. The second connector is configured within the front grill of the automobile and enable the first and second connector to securely hold the left and right arm with license plate at the front portion of the automobile. The system can also include levers configured underneath the second connector, wherein the levers enable the first and second connector to be connected to the front grill of the automobile.

The levers are secured onto the front grill of the automobile to enable the first and second connector to be held in position.

The license plate is not in contact with the front grill of the automobile.

A torx screw is configured to prevent unauthorized removals of the license plate from the right arm and the left arm.

The first and second connector enable the license plate to be held in place at the front portion of the automobile.

A method can include configuring a first arm at a first position in a vertical direction. The method may also include positioning a second arm at a second position in the vertical direction, wherein the second arm is parallel to the first arm. The second arm is configured to hold a display together with the first arm in the vertical direction. The method may also include configuring a top connector in a horizontal direction. The top connector is connected to the left and right arm, and wherein the top connector is configured to provide additional structure support for a v-slot for alignment and positioning to a front end of a device. The method can also include configuring a bottom connector below the top connector in the horizontal direction, wherein the bottom connector is configured to provide additional structure support for the v-slot for alignment and positioning to the front portion of the device, and wherein the bottom connector and top connector connect to the front portion of the device and enable the first and second arm to securely hold the display at a front end of the device. The method may also include positioning levers above and below the top and bottom connector, wherein the lever is configured onto the front portion of the device to enable the top and bottom connector to be secured onto the front portion of the device.

The first and second arm enable the display to be held in front of the device without the display being in direct contact to the device.

The top and bottom connector are positioned with a v-slot onto a front grill of the device to enable the first and second arm to securely hold the display in front of the device.

A torx screw, or similar type of tamper-resistant screw, is configured to prevent the display from unauthorized tampering and unauthorized removals.

The levers are secured onto a front grill on the front portion of the device to ensure that the top and bottom connector and the left and right arm are secured onto the front portion of the device.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE FIGURES

The system of provides a safe and secure way of displaying a license plate in front of an automobile without being in contact with the automobile. Reference numerals are intended to refer to like components, and in which.

Unless otherwise indicated illustrations in the figures are not necessarily drawn to scale.

DETAILED DESCRIPTION OF SOME EMBODIMENTS

Background and Context

The disclosed embodiments are best understood by reference to the Figures and detailed description herein.

Disclosed embodiments of the invention are discussed below with reference to the Figures. However, those skilled in the art will appreciate that the detailed description provided herein with respect to these figures is for explanatory purposes as the invention may extends beyond these currently disclosed embodiments. Various alternate approaches to implement the functionality of any given detail described herein are envisioned. That is, there are modifications and variations of the invention that are too numerous to be listed but that all fit within the scope of the invention. Also, singular words should be read as plural and vice-versa, where appropriate, and alternative embodiments do not imply mutual exclusivity.

It is to be further understood that the disclosed embodiments are not necessarily limited to the particular methodology, techniques, uses, and applications, described herein, as these may vary. It is also to be understood that the terminology used herein is used for the purpose of describing particular embodiments only, and is not otherwise intended to limit the scope of the present invention. It must be noted that as used herein in the detailed description and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Physical and/or conceptual structures described herein are to be understood also to refer to functional equivalents of such structures.

All words of approximation as used in the present disclosure and claims should be construed to mean "approximate," rather than "perfect". Words of approximation, include, yet are not limited to terms such as "substantial", "nearly", "almost", "about", "generally", "largely", etc.

Terms of degree are not necessarily indefinite. "Claim language employing terms of degree has long been found definite where it provided enough certainty to one of skill in the art when read in the context of the invention." *Interval Licensing LLC v. AOL, Inc.*, 766 F.3d 1364, 1370, 112 USPQ2d 1188, 1192-93 (Fed. Cir. 2014) (citing *Eibel Process Co. v. Minnesota & Ontario Paper Co.*, 261 U.S. 45, 65-66 (1923. Thus, when a term of degree is used in the claim, the examiner should determine whether the specification provides some standard for measuring that degree. *Hearing Components, Inc. v. Shure Inc.*, 600 F.3d 1357, 1367, 94 USPQ2d 1385, 1391 (Fed. Cir. 2010); *Enzo Biochem, Inc., v. Applera Corp.*, 599 F.3d 1325, 1332, 94 USPQ2d 1321, 1326 (Fed. Cir. 2010); *Seattle Box Co., Inc. v. Indus. Crating & Packing, Inc.*, 731 F.2d 818, 826, 221 USPQ 568, 574 (Fed. Cir. 1984).

The term "substantially" is often used in conjunction with another term to describe a particular characteristic of the claimed invention. It is a broad term. *In re Nehrenberg*, 280 F.2d 161, 126 USPQ 383 (CCPA 1960). The court held that the limitation "to substantially increase the efficiency of the compound as a copper extractant" was definite in view of the general guidelines contained in the specification. *In re Mattison*, 509 F.2d 563, 184 USPQ 484 (CCPA 1975).

All questions of enablement are evaluated against the claimed subject matter. The focus of the examination inquiry is whether everything within the scope of the claim is enabled.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although Claims have been included in this Application to specific enumerated combinations of features, it should be understood that the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function(s of the teachings related to any described embodiment of the present invention may be suitably changed by those skilled in the art.

Aspects of the present invention are described below with reference to flowchart illustrations and/or block diagrams of methods, and systems according to the disclosed embodiments. Each block of the flowchart illustrations and/or block diagrams, and combinations of blocks in the flowchart illustrations and/or block diagrams, can be implemented by various means.

The flowchart and block diagrams in the figures illustrate the architecture, functionality, and operation of possible implementations of systems and methods according to various embodiments. In this regard, each block in the flowchart or block diagrams may represent a segment which comprises one or more executable instructions for implementing the specified logical function(s). Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices which are not explicitly described as having such functionality/features. Also, various embodiments of the present invention need not include a device itself.

Where the car license plate system is described, it will be understood by those of ordinary skill in the art that: (i) system and structures alternative to those described may be implemented, and (ii) other structures other than described systems may be implemented. Any schematic illustrations of License plate holder and display systems and accompanying descriptions of any sample license plate display and holder systems presented herein are example arrangements for stored representations of information. Embodiments of the invention may also be implemented in one or a combination of license plate holder and systems.

More specifically, as will be appreciated by one skilled in the art, aspects of the present invention may be embodied as a system and/or method.

Additionally, any uses of the phrase "configured to" or "operable for" can include generic structure that is manipulated to operate in a manner that is capable of performing the task(s) at issue. "Configured to" may also include license plate holder and display devices that are adapted to perform one or more tasks.

Introduction

The present invention provides a license plate holder and display system to place in front of an automobile. License plates can be typically integrated into the automobile. In other words, license plates can be placed at the front and back of the automobile by being drilled into the automobile. A plurality of holes can be made in the front or back of the automobile. The license plate can be placed in both the front and back of the automobile. Further, screws can be used to secure the license plate within the holes at the front and the back of the automobile.

A need exists for the license plate to be displayed in front or back of the automobile without having to drill holes into the automobile, or use screws to secure the license plate into the automobile. Moreover, the license plate can be effectively displayed and secured in front and in back of the automobile without the license plate being in contact with the automobile.

Through the license display and holder system, the license plate can be displayed in front and in back of the automobile without being in direction contact with the automobile. The license plate holder and display system will securely display the license plate in both the front and the back of the automobile without the license plate having to be in contact with the automoible. A such, the front and back of the car do not have to have any holes and screws installed on its exterior to have the license plate be securely held and displayed.

System Structure

Figure 1:
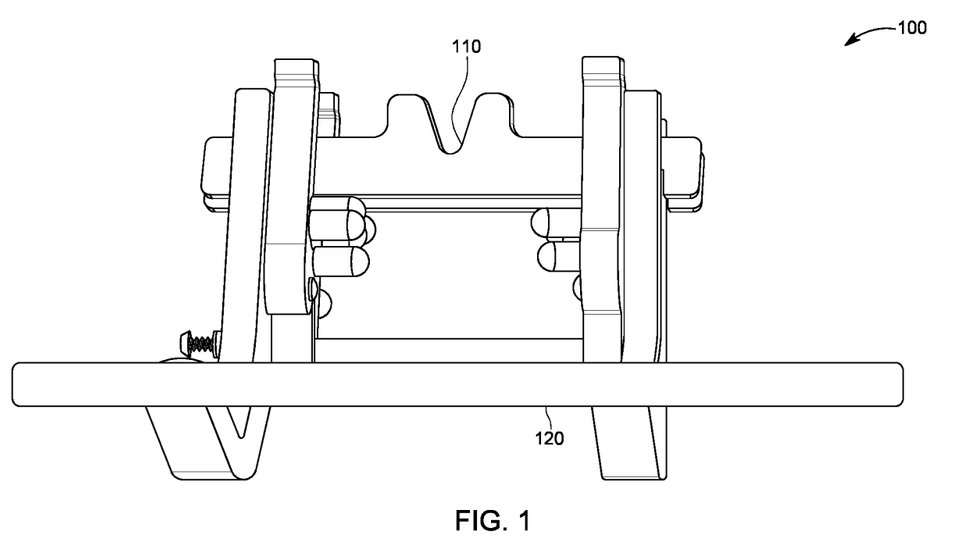
FIG. 1 illustrates an exemplary diagram illustrating a v-slot and a crossbar in accordance with an embodiment of the presently disclosed embodiments.

FIG. 1 illustrates a system 100 that can be placed at the front of an automobile. The system 100 includes a v-slot 110 and a crossbar 120. The v-slot 110 can be aligned and positioned at the center vertical grill divider of an automobile. The front portion of the autotomobile in which the system 100 can be placed can have a center vertical grill divider. The v-slot 100 can accordingly be aligned and positioned with the center vertical grill divider of the automobile when the crossbar 120 is in an open position. More details will be illustrated in FIGS. 2-3.

Figure 2:
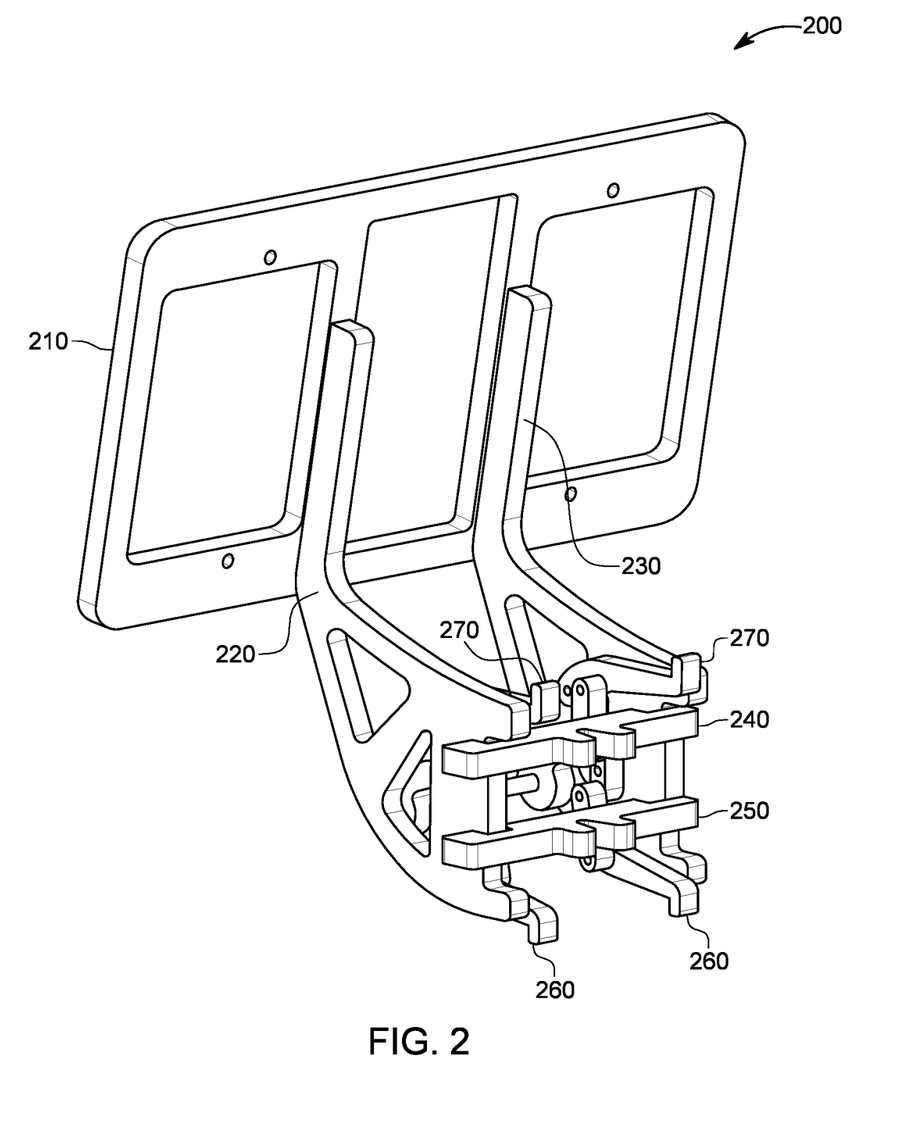
FIG. 2 illustrates an exemplary diagram of a license plate display and holder system in accordance with an embodiment of the presently disclosed embodiments

FIG. 2, illustrates a license plate holder and display system (system) 200. The system 100 can include a first arm/left arm 220 and a second arm right arm 230. Further, the system 100 can also include a top connector 240 and a bottom connector 250. In addition, the system 100 may also include a lever 260.

In FIG. 2, the system 200 can be configured to hold a the license plate 210. To hold the license plate 210, the system 200 can use the left arm 220, right arm 230, top connector 240, bottom connector 250, and lever 260 respectively.

Referring to FIG. 2, the license plate can be displaced vertically with the left arm 220 and the right arm 230. The left arm 220 and the right arm 230 can be parallel to each other and extend in the vertical direction. The license plate 210 can be placed in front of the left arm 220 and the right arm 230. The left arm 220 and the right arm 230 can both securely hold and display the license plate 210 in the front of an automobile. Moreover, the left arm 220 and the right arm 230 would both be between the automobile and the license plate 210. As a result, the license plate 210 will not come into direct contact with the automobile. Accordingly, the left arm 220 and the right arm 230 securely hold and display the license plate 210 in front of an automobile without the license plate 210 being in direct contact with the automobile.

In FIG. 2, the top connector 240 and the bottom connector 250 are connected to the left arm 220 and the right arm 230. Above the top connector 240 and bottom connector 250 are levers 270. The top connector 240 and the bottom connector 250 serve as additional structure support with the v-slot described in FIG. 1 for alignment and positioning within the front grill of the automobile. The levers 270 latch/grab onto an upper rail of the front grill of the automobile to help enable the system 200 to be secured onto the automobile.

Referring to FIG. 2, the lever 260 can also be secured to the front grill of the automobile. The lever 260 can be situated beneath the left arm 220, right arm 230, top connector 240, and the bottom connector 250. After the left arm 220, and right arm 230 securely hold the license plate, and the top connector 240 and bottom connector 250 are secured within the front portion of the automobile, the lever 260 can then also be secured within the lower rail of the front portion of the automobile.

In FIG. 2, the lever 260 can also be used to secure the system 200 onto the automobile and also remove the entire system 200 from the automobile. After the left arm 220, right arm 230, top connector 240, and bottom connector 250 are secure, the lever 260 can then be secured on the front portion of the automobile. The lever 260 can be extended toward the automobile and secured within the grill that can be located in the front portion of the automobile.

Referring to FIG. 2, to remove the system 200 from the automobile, the lever 260 can be removed from the front of the automobile. The lever can be pulled away from the automobile, which can then begin the process of removing the system 200 from the automobile. Removing the lever 260 can begin the process of removing the entire system 200 from the automobile. As the lever 260 is first removed, the bottom connector 250 and top connector 240 can be removed from the front of the automobile. Further, the top portion of the system 200 that includes the left arm 220, right arm 230 and license plate 210 can then be removed.

Figure 3:
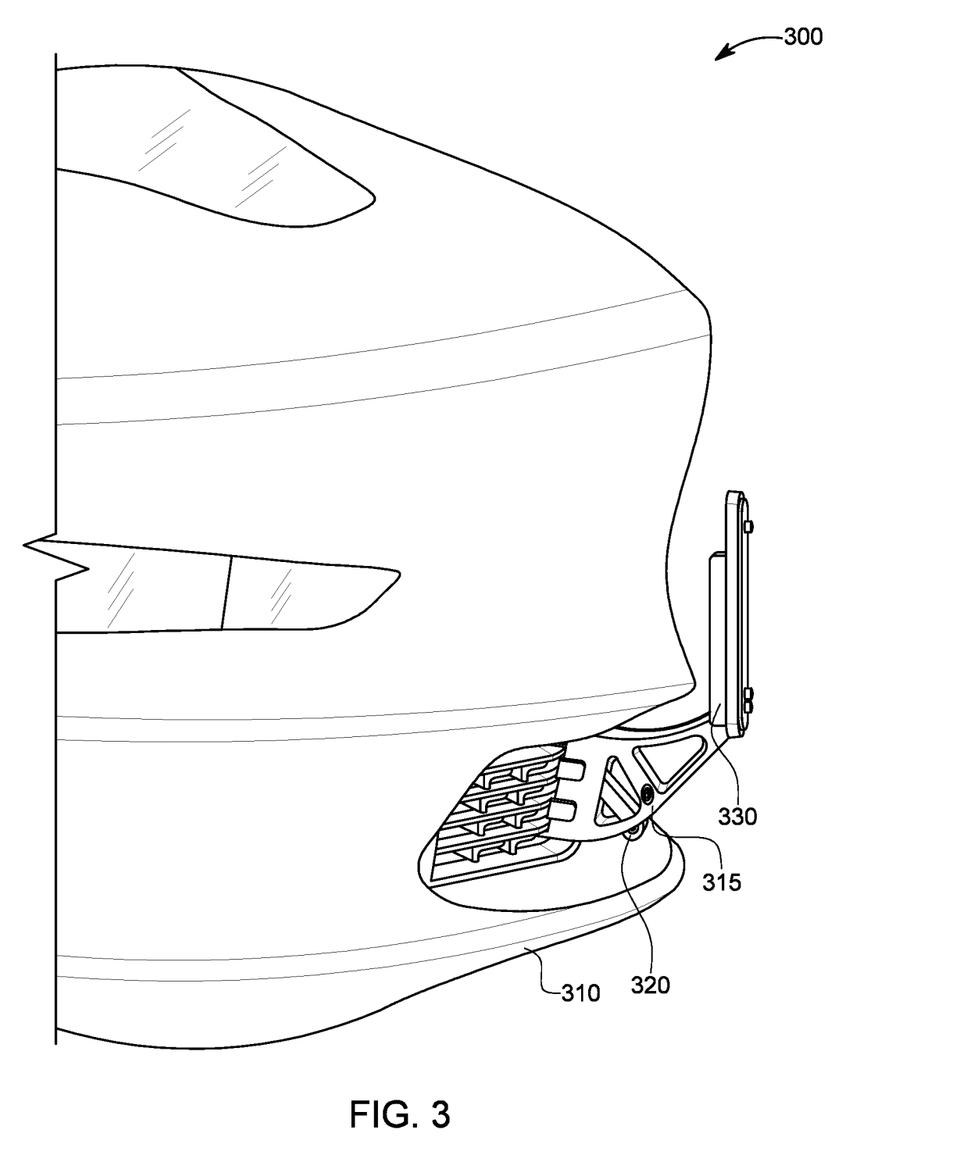
FIG. 3 illustrates another diagram of a license plate display and holder system in relation to an automobile in accordance with an embodiment of the presently disclosed embodiments.

Once the system 200 is secured onto an automobile, a need can exist to ensure that the system 200 is not tampered with or removed by an unauthorized party. FIG. 3 illustrates features that can enable the system 200 to remain secured onto the automobile. Moreover, the system 200 includes one or more theft and tamper preventive features that can enable the system 200 to remain secure onto the automobile without being tampered with or removed by an unauthorized party.

Referring to FIG. 3, a system 300 that includes front portion of an automobile and the license plate holder is illustrated. A right arm 330 of the license plate holder is illustrated. The right arm 330 securely holds up the license plate along with the left arm (shown in FIG. 2). A lever 320 similar to the lever 260 in FIG. 2 is shown. The lever 320 can secure the entire license plate holder onto the front portion 310 of the automobile. As with the system 200 in FIG. 2, the system 300 of FIG. 3 can enable the license plate to be displayed in front of the automobile without being in direct contact with the automobile.

Still referring to FIG. 3, a tamper-resistant screw such as a torx screw 315 is illustrated. The torx screw 315 can be used to prevent any unauthorized removal or tampering with respect to the system 300. The owner of the system 300 or other authorized individuals can tighten the torx screw 315 to ensure that there is no unauthorized tampering with regard to the system 300. One or more unauthorized users may attempt to tamper with the lever 320 and or the right arm 330. For instance, such unauthorized tampering can include persons trying to loosen or remove the right arm 330 to get access to the license plate. Another example of tampering can include an unauthorized user attempting to dislodge the lever 320 from the front portion 310 of the automobile to make it easier to remove the license plate from the system 300. One or more tampering attempts can enable the license plate to be dislodged and/or removed from the system 300, and also allow an authorized user to steal the license plate and the system 300 altogether.

In FIG. 3, in response to possible tampering attempts, the torx screw 315 can be tightened. Further, by tightening the torx screw 315, each element of the system 300 is in better position to where any tampering of those elements will not result in the system 300 being removed from the automobile and the license plate being removed from the system 300.

Referring to FIG. 3, in an example, the user tightening the torx screw 315 after the system 300 has been securely clamped to the front portion 310 can prevent an authorized user from trying to dislodge the lever 320 from the front portion 310 of the automobile. The torx screw 315 can be tighted to the point to where the unauthorized user cannot generate enough leverage to move the lever vertically and away from the front portion 310. If the unauthorized user cannot move the lever 320 vertically and away from the front portion, the unauthorized user cannot use the lever 320 to begin to remove the system 300 from the front portion 310.

In FIG. 3, in another example, the user tightening the torx screw 315 can eliminate any leverage that an unauthorized user may have to try to dislodge the right arm 330 from the license plate in order to get access to the license plate. The tightening of the torx screw 315 can eliminate any possible leverage that may be present when the system 300 is first securely clamped onto the front portion. As such, the unauthorized user does not have any such leverage available to attempt to move the fight arm 330 or the left arm (shown in FIG. 2) and/or have access to the license plate, or remove the system 300 altogether from the front portion 310.

With respect to FIG. 3, the torx screw 315 can be an additional security measure for the system 300 to prevent an unauthorized tampering or removal to the license plate and the system 300. While the system 300 may be securely placed on the front portion 310, the user tightening the torx screw 315 can further eliminate any possible leverage that may have existed when the system 300 was first secured onto the front portion 310. Accordingly, each element of the system 300 including the right arm 330 and the lever 320 mentioned above are further protected from any unauthorized users tampering with or attempting to remove either the system 300 or the license plate from the front portion 310 of the automobile.

Figure 4:
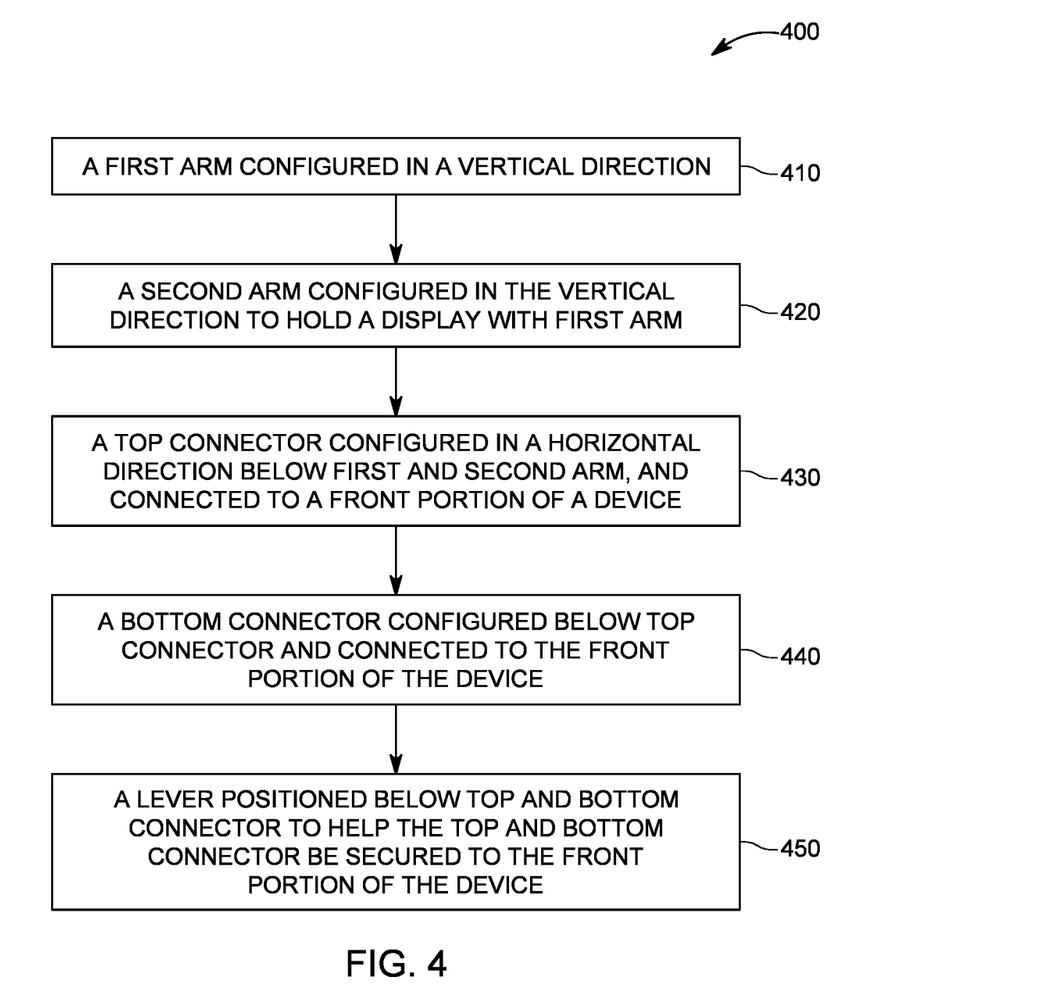
FIG. 4 illustrates a flowchart describing a license plate display and holder system in accordance with an embodiment of the presently disclosed embodiments.

Referring to FIG. 4, a method 400 is illustrated to securely display the license plate in front of an automobile. In addition, the method 400 ensures that the license plate can be displayed in front of the automobile without being in direct contact with the automobile.

In FIG. 4, at step 410, a first arm or a left arm is configured in a vertical direction. The first arm is configured to enable the license plate to be displated in front of the automobile without being in direct contact with the automobile.

In FIG. 4, at step 420, a second arm or a right arm is configured in the vertical direction. The second arm is configured parallel to the first arm. The second arm is used in conjunction with the first arm to securely display the license plate in front of the automobile without being in direct contact with the automobile.

Referring to FIG. 4, at step 430, a top connector is configured in a horizontal direction. The top connector is configured underneath the first arm and second arm, and also connected to the first arm and second arm. The top connector is situated to serve as additional structure support for a v-slot for alignment and positioning.

In FIG. 4, at step 440, a bottom connector is configured underneath the first arm and second arm, and also underneath the top connector. The bottom connector is also situated to serve as additional structure support for the v-slot for alignment and positioning.

Referring to FIG. 4, at step 450, levers are configured above and below the top connector and the bottom connector. The levers are configured to also be secured into the grill at the front portion of the automobile. The levers are the final clamp that secures the entire system onto the automobile. The levers can be clamped down into the grill of the front portion of the automobile, and also removed when the system needs to be removed from the automobile.

Those skilled in the art will appreciate that the example embodiments are non-exhaustive and that embodiments other than that described here may be included without departing from the scope and spirit of the presently disclosed embodiments.

Advantages

Disclosed embodiments relate to methods and systems for more efficiently and effectively displaying a license plate in front of an automobile. The license plate can be safely displayed in front of the automobile without being in contact with the automobile, and without having any holes being drilled within the automobile to secure the license plate.

Another advantage is that the license plate can be safetly displayed in front of the automobile without any unauthorized removal or tampering of the license plate and the system by an unauthorized party. A torx screw configured on the system, and which can be further tightened, can prevent any unauthorized tampering and/or removal of either the license plate or the system.

Accordingly, the present invention can safely and efficiently display a license plate in license plate holder and display system in front of an automobile without adversely affecting the structure of the automobile.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:
   a first arm configured at a first position in a vertical direction;
   a second arm configured at a second position in the vertical direction, wherein the second arm is parallel to the first arm, and configured to hold a display along with the first arm in the vertical direction;
   a top connector configured in a horizontal direction, wherein the top connector is connected to the first and second arm and configured to a lower portion of the first and second arm, and wherein the top connector is configured to provide additional structure support for a v-slot for alignment and positioning to a front portion of a device;
   a bottom connector configured below the top connector in the horizontal direction, wherein the bottom connector is configured to connect to the front portion of the device, wherein the bottom connector and top connector are configured to provide the additional structure support for the v-slot for the alignment and positioning and also enable the first and second arm to securely hold the display at a front end of the device; and
   levers positioned above and below the top and bottom connector, wherein the levers are configured on the front portion of the device to enable the top and bottom connector to be secured on the front portion of the device.

2. The system of claim 1, wherein the first arm and second arm are configured to hold the display without the display being in contact with the device.

3. The system of claim 1, further comprising:
   a torq screw positioned in front of the device.

4. The system of claim 1, wherein the v-slot is configured to be aligned and positioned to be at a center vertical grill divider of an automobile.

5. The system of claim 1, wherein the levers are lifted to remove the first arm and the second arm from the front portion of the device.

6. The system of claim 1, further comprising:
   a torq screw to prevent tampering of the display or unauthorized removals of the display by being tightened to prevent the right arm from being dislodged.

7. A system comprising:
   a left arm installed at a first position;
   a right arm installed at a second position parallel to the left arm, wherein the right arm is configured to hold a license plate with the left arm at a front portion of an automobile;
   a first connector configured to a lower portion of the left and right arm, wherein the first connector provides additional structure support to a v-slot for alignment and positioning within a front grill of the automobile;
   a second connector configured underneath the first connector, wherein the second connector is configured to provide the additional structure support along with the first connector to the v-slot for the alignment and positioning at the front portion of the automobile; and levers configured above and underneath the second connector, wherein the lever enables the first and second connector to be positioned to the front grill of the automobile.

8. The system of claim 7, wherein the v-slot is aligned and positioned to be at a center vertical grill divider of the automobile.

9. The system of claim 7, wherein left arm holds the license plate and prevents the license plate from being in contact with the front grill of the automobile.

10. The system of claim 7, further comprising:

a torq screw configured to prevent unauthorized removals of the license plate from the right arm and the left arm, wherein a tightening of the torq screw prevents a dislodge of at least one of the levers.

11. The system of claim 7, wherein the first and second connector enable the license plate to be held in place at the front portion of the automobile.

12. The system of claim 7, wherein the lever is secured at the front portion of the automobile.

13. The system of claim 7, wherein the levers enables the left and right arm to securely hold the license plate in front of the automobile.

14. A method comprising:

configuring a first arm at a first position in a vertical direction;

positioning a second arm at a second position in the vertical direction, wherein the second arm is parallel to the first arm, and wherein the second arm is configured to hold a display together with the first arm in the vertical direction;

configuring a top connector in a horizontal direction, wherein the top connector is connected to a left and right arm, and wherein the top connector is configured to provide additional structure support for alignment and positioning to a front end of a device;

configuring a bottom connector below the top connector in the horizontal direction, wherein the bottom connector is configured to provide the additional structure support for a v-slot for the alignment and positioning along with the top connector to the front portion of the device; and positioning levers above and below the top and bottom connector, wherein the lever is configured onto the front portion of the device to enable the top and bottom connector to be secured onto the front portion of the device.

15. The method of claim 14, wherein the first and second arm enable the display to be held in front of the device without the display being in direct contact to the device.

16. The method of claim 14, wherein the device is an automobile and the display is a license plate.

17. The method of claim 14, wherein the top and bottom connector provide the structure support for the v-slot for the alignment and positioning onto a front grill of the device and enable the first and second arm to securely hold the display in front of the device.

18. The method of claim 14, further comprising:

configuring a torq screw to prevent the display from unauthorized tampering and unauthorized removals.

19. The method of claim 14, wherein the levers are secured onto a front grill on the front portion of the device to ensure that the top and bottom connector and the left and right arm are secured onto the front portion of the device.

* * * * *